United States Patent
Finn et al.

(10) Patent No.: US 8,458,603 B2
(45) Date of Patent: Jun. 4, 2013

(54) CONTEXTUAL TEMPLATES FOR MODIFYING OBJECTS IN A VIRTUAL UNIVERSE

(75) Inventors: Peter George Finn, Brampton (CA); Rick Allen Hamilton, II, Charlottesville, VA (US); Brian Marshall O'Connell, Cary, NC (US); Clifford Alan Pickover, Yorktown Heights, NY (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/531,265

(22) Filed: Jun. 22, 2012

(65) Prior Publication Data

US 2012/0266088 A1    Oct. 18, 2012

Related U.S. Application Data

(63) Continuation of application No. 12/353,656, filed on Jan. 14, 2009, now abandoned.

(51) Int. Cl.
| G06F 3/048 | (2006.01) |
| G09G 5/00 | (2006.01) |
| G06T 15/00 | (2011.01) |

(52) U.S. Cl.
USPC ............... 715/757; 345/582; 345/419

(58) Field of Classification Search
USPC .......................... 345/619; 715/757
See application file for complete search history.

(56) References Cited

U.S. PATENT DOCUMENTS

| 6,023,270 A | 2/2000 | Brush, II et al. |
| 6,036,601 A | 3/2000 | Heckel |
| 6,349,301 B1 | 2/2002 | Mitchell et al. |
| 6,394,301 B1 | 5/2002 | Koch |
| 6,421,047 B1 | 7/2002 | de Groot |
| 6,532,007 B1 | 3/2003 | Matsuda |
| 6,570,563 B1 | 5/2003 | Honda |
| 6,580,811 B2 | 6/2003 | Maurer et al. |
| 6,749,510 B2 | 6/2004 | Giobbi |
| 6,788,946 B2 | 9/2004 | Winchell et al. |
| 6,798,407 B1 | 9/2004 | Benman |

(Continued)

OTHER PUBLICATIONS

"Avatar-Based Marketing: The Avatar-Based Panel (Part One of Five)," New World Notes, http://nwn.blogs.com/nwn/2006/06/avatarbased_mar.html, accessed Nov. 10, 2011, 15 pages.

(Continued)

*Primary Examiner* — Said Broome
*Assistant Examiner* — Peter Hoang
(74) *Attorney, Agent, or Firm* — Yee & Associates, P.C.; Mark Vallone

(57) ABSTRACT

A computer implemented method, apparatus, and computer program product for modifying object styles in a virtual universe. An object is rendered in accordance with a first contextual style template from a plurality of contextual style templates. The first contextual style template comprises first geometric and texture data to display the object with a first style. In response to detecting a set of contextual changes associated with the object, a second contextual style template is identified from the plurality of contextual style templates. The set of contextual changes triggers implementation of the second contextual style template to change the first style of the object to a second style. The object is rendered in accordance with second geometric and texture data in the second contextual style template to form a modified object, wherein the modified object is displayed with the second style.

18 Claims, 7 Drawing Sheets

U.S. PATENT DOCUMENTS

| | | | |
|---|---|---|---|
| 6,868,389 | B1 | 3/2005 | Wilkins et al. |
| 6,895,406 | B2 | 5/2005 | Fables et al. |
| 6,954,728 | B1 | 10/2005 | Kusumoto et al. |
| 6,981,220 | B2 | 12/2005 | Matsuda |
| 7,025,675 | B2 | 4/2006 | Fogel et al. |
| 7,158,135 | B2 | 1/2007 | Santodomingo et al. |
| 7,305,691 | B2 | 12/2007 | Cristofalo |
| 7,320,031 | B2 | 1/2008 | Konig et al. |
| 7,454,065 | B2 | 11/2008 | Satoh |
| 7,479,967 | B2 | 1/2009 | Bachelder et al. |
| 7,542,040 | B2 | 6/2009 | Templeman |
| 7,685,204 | B2 | 3/2010 | Rogers |
| 7,720,835 | B2 | 5/2010 | Ward et al. |
| 7,805,680 | B2 | 9/2010 | Meyers et al. |
| 7,822,687 | B2 | 10/2010 | Brillon et al. |
| 8,001,161 | B2 | 8/2011 | Finn et al. |
| 8,184,116 | B2 | 5/2012 | Finn et al. |
| 8,203,503 | B2 | 6/2012 | Castellar et al. |
| 8,212,809 | B2 | 7/2012 | Finn et al. |
| 8,233,005 | B2 | 7/2012 | Finn et al. |
| 8,259,100 | B2 | 9/2012 | Finn et al. |
| 2001/0033675 | A1 | 10/2001 | Maurer et al. |
| 2002/0024532 | A1 | 2/2002 | Fables et al. |
| 2002/0056091 | A1 | 5/2002 | Bala et al. |
| 2002/0107072 | A1 | 8/2002 | Giobbi |
| 2002/0113809 | A1 | 8/2002 | Akazawa et al. |
| 2002/0138607 | A1 | 9/2002 | O'Rourke et al. |
| 2002/0169644 | A1 | 11/2002 | Greene |
| 2003/0004774 | A1 | 1/2003 | Greene et al. |
| 2003/0091229 | A1 | 5/2003 | Edge et al. |
| 2004/0034561 | A1 | 2/2004 | Smith |
| 2004/0053690 | A1 | 3/2004 | Fogel et al. |
| 2004/0166935 | A1 | 8/2004 | Gavin et al. |
| 2004/0210634 | A1 | 10/2004 | Ferrer et al. |
| 2004/0220850 | A1 | 11/2004 | Ferrer et al. |
| 2005/0071306 | A1 | 3/2005 | Kruszewski et al. |
| 2005/0086112 | A1 | 4/2005 | Shkedi |
| 2005/0086605 | A1 | 4/2005 | Ferrer et al. |
| 2005/0114198 | A1 | 5/2005 | Koningstein et al. |
| 2005/0125229 | A1 | 6/2005 | Kurzweil |
| 2005/0151728 | A1 | 7/2005 | Nenonen |
| 2005/0156928 | A1 | 7/2005 | Santodomingo et al. |
| 2005/0179685 | A1 | 8/2005 | Kake et al. |
| 2005/0253872 | A1 | 11/2005 | Goss et al. |
| 2005/0286769 | A1 | 12/2005 | Satoh |
| 2006/0130095 | A1 | 6/2006 | Willis et al. |
| 2006/0168143 | A1 | 7/2006 | Moetteli |
| 2006/0194632 | A1 | 8/2006 | Hendrickson et al. |
| 2006/0195462 | A1 | 8/2006 | Rogers |
| 2006/0258462 | A1 | 11/2006 | Cheng et al. |
| 2007/0003915 | A1 | 1/2007 | Templeman |
| 2007/0035561 | A1 | 2/2007 | Bachelder et al. |
| 2007/0043616 | A1 | 2/2007 | Kutaragi et al. |
| 2007/0100650 | A1 | 5/2007 | Ramer et al. |
| 2007/0191104 | A1 | 8/2007 | Van Luchene |
| 2007/0236516 | A1 | 10/2007 | Castellar et al. |
| 2007/0247979 | A1 | 10/2007 | Brillon et al. |
| 2007/0252841 | A1 | 11/2007 | Kim |
| 2007/0261109 | A1 | 11/2007 | Renaud et al. |
| 2008/0004119 | A1 | 1/2008 | Van Luchene et al. |
| 2008/0252716 | A1 | 10/2008 | Kano et al. |
| 2008/0281622 | A1 | 11/2008 | Hoal |
| 2009/0063168 | A1 | 3/2009 | Finn et al. |
| 2009/0089157 | A1 | 4/2009 | Narayanan |
| 2009/0227368 | A1 | 9/2009 | Wyatt |
| 2009/0254417 | A1 | 10/2009 | Beilby et al. |
| 2009/0267937 | A1 | 10/2009 | Finn et al. |
| 2009/0267948 | A1 | 10/2009 | Finn et al. |
| 2009/0267950 | A1 | 10/2009 | Finn et al. |
| 2009/0267960 | A1 | 10/2009 | Finn et al. |
| 2009/0271422 | A1 | 10/2009 | Finn et al. |
| 2009/0299960 | A1 | 12/2009 | Lineberger |
| 2009/0327219 | A1 | 12/2009 | Finn et al. |
| 2010/0001993 | A1 | 1/2010 | Finn et al. |
| 2010/0005423 | A1 | 1/2010 | Finn et al. |
| 2010/0177117 | A1 | 7/2010 | Finn et al. |
| 2010/0205179 | A1 | 8/2010 | Carson et al. |

OTHER PUBLICATIONS

"Avatar-Based Marketing: The Avatar-Based Panel (Part Two of Five)," New World Notes, http://nwn.blogs.com/nwn/2006/06/avatarbased_mar.html, accessed Nov. 10, 2011, 6 pages.

"Avatar-Based Marketing: The Avatar-Based Panel (Part Three of Five)," New World Notes, http://nwn.blogs.com/nwn/2006/06/avatarbased_mar.html, accessed Nov. 10, 2011, 6 pages.

"Avatar-Based Marketing: The Avatar-Based Panel (Part Four of Five)," New World Notes, http://nwn_blogs_com/nwn/2006/06/avatarbased_mar.html, accessed Nov. 10, 2011, 6 pages.

"Avatar-Based Marketing: The Avatar-Based Panel (Part Five of Five)," New World Notes, http://nwn.blogs.com/nwn/2006/06/avatarbased_mar.html, accessed Nov. 10, 2011, 6 pages.

"Life2Life—ECS-Powered Amazon Store Within Second Life," Amazon Web Services Blog, http://aws.typepad.com/aws12006/07/lifetolife_ecspo.html, accessed Nov. 10, 2011, 7 pages.

"Trap," NWN Wikia, http://web archive.org/web/200711120848361http://nwn_wikia_com/wiki/Trap, accessed Sep. 14, 2011, 3 pages.

"Unseen," WOW Wiki, http://web.archive.org/web/20070207113119/http://www.wowwiki.com/Unseen, accessed Sep. 15, 2011, 2 pages.

Gladestrider, "ZAM Everquest Classes: The Ranger—Tracking-Help," http://everquest.allakhazam.com/db/classes. html?=10&mid=1098807428716491276, dated Oct. 26, 2004, 2 pages.

Hughes, "Ben Folds in Second Life the Event," Eightbar, http://eightbar.co.uk/2006/10/20/ben-folds-in-second-life-the-event, Oct. 20, 2006, 3 pages.

Hughes, "Planes, trains and automobiles, here come Nissan," Eightbar, http://eightbar.co.uk/2006/10/24/planes-trains-and-automobiles-here-come-nissan, Oct. 24, 2006, 3 pages.

Hughes, "The Sony BMG media island, it is very good," Eightbar, http://eightbar.co.uk/2006/10/19/the-sony-bmg-media-island-it-is-very-good, Oct. 19, 2006, 8 pages.

Hughes, "Those custom Reeboks and the next party," Eightbar, http://eightbar.co.uk/2006/10/11/those-custom-reeboks-and-the-next-party, accessed Oct. 11, 2006, 5 pages.

Kiss et al., "Viewpoint Adaptation during Navigation Based on Stimuli from the Virtual Environment," Web3D '03 Proceedings of the 8th International Conference on 3D Web Technology, Mar. 19-26, 2003.

Reynolds, "Virtual Worlds introduction presentation," Eightbar, http://eightbar.co.uk/2006/08/17/virtual-worlds-introduction-presentation, Aug. 17, 2006, 8 pages.

Riddikulus, "Dungeons and Dragons Online Eberron Unlimited Forums: Repeating quests-limit?" http://forums.ddo.com/showthread.php?t=123676, dated Oct. 8, 2007, 6 pages.

USPTO Office Action regarding U.S. Appl. No. 11/846,724, dated Oct. 27, 2010, 14 pages.

USPTO Final Office Action regarding U.S. Appl. No. 11/846,724, dated Feb. 4, 2011, 9 pages.

USPTO Office Action regarding U.S. Appl. No. 12/108,925, dated Sep. 9, 2011, 24 pages.

USPTO Notice of Allowance regarding U.S. Appl. No. 12/108,925, dated Dec. 29, 2011, 18 pages.

USPTO Office Action regarding U.S. Appl. No. 12/108,968, dated Oct. 28, 2011, 37 pages.

USPTO Notice of Allowance regarding U.S. Appl. No. 12/108,968, dated Feb. 21, 2012, 21 pages.

USPTO Office Action regarding U.S. Appl. No. 12/108,987, dated Dec. 1, 2011, 39 pages.

USPTO Office Action regarding U.S. Appl. No. 12/109,010, dated Jan. 30, 2012, 43 pages.

USPTO Office Action regarding U.S. Appl. No. 12/109,023, dated Dec. 1, 2010, 20 pages.

USPTO Notice of Allowance regarding U.S. Appl. No. 12/109,023, dated Apr. 13, 2011, 13 pages.

USPTO Supplemental Notice of Allowance regarding U.S. Appl. No. 12/109,023, dated May 13, 2011, 4 pages.

USPTO Office Action regarding U.S. Appl. No. 12/109,040, dated Feb. 3, 2011, 28 pages.

USPTO Final Office Action regarding U.S. Appl. No. 12/109,040, dated Jul. 15, 2011, 20 pages.
USPTO Office Action regarding U.S. Appl. No. 12/165,922, dated Nov. 10, 2011, 49 pages.
USPTO Office Action regarding U.S. Appl. No. 12/168,657, dated Apr. 26, 2011, 30 pages.
USPTO Final Office Action regarding U.S. Appl. No. 12/168,657, dated Oct. 4, 2011, 25 pages.
USPTO Office Action regarding U.S. Appl. No. 12/353,656, dated Aug. 24, 2011, 38 pages.
Response to Office Action regarding U.S. Appl. No. 12/353,656, dated Nov. 22, 2011, 21 pages.
USPTO Final Office Action regarding U.S. Appl. No. 12/353,656, dated Dec. 23, 2011, 47 pages.
USPTO Notice of Allowance regarding U.S. Appl. No. 12/108,987, dated Mar. 16, 2012, 12 pages.
USPTO Notice of Allowance regarding U.S. Appl. No. 12/109,010, dated Apr. 11, 2012, 2012, 15 pages.
USPTO Final Office Action regarding U.S. Appl. No. 12/165,922, dated Jun. 21, 2012, 30 pages.
USPTO Office Action regarding U.S. Appl. No. 12/168,657, dated Jun. 22, 2012, 45 pages.
Office Action, dated Dec. 20, 2012, regarding U.S. Appl. No. 11/846,724, 12 pages.
Notice of Allowance, dated Dec. 13, 2012, regarding U.S. Appl. No. 12/168,657, 12 pages.
Notice of Allowance, dated Feb. 14, 2013, regarding U.S. Appl. No. 12/109,040, 38 pages.
Notice of Allowance, dated Feb. 22, 2013, regarding U.S. Appl. No. 12/168,657, 13 pages.

| CONTEXT COLOR | "BLEND" STYLE | "HIGH VISIBILITY" STYLE |
|---|---|---|
| WHITE | WHITE , GREY | BLUE, RED |
| BLUE | BLUE- GREY, BLUE | YELLOW, RED |
| RED | RED | BLUE |
| ⋮ | ⋮ | ⋮ |

OBJECT AVATAR
RENDERING (OAR) TABLE
500

- 502 — RenderingUUID = PRIMARY KEY.
- 504 — ObjectUUID = FOREIGN KEY TO EXISTING OBJECT TABLE.
- 506 — AvatarUUID = FOREIGN KEY TO EXISTING AVATAR TABLE.
- 508 — Zone1EnterTime = UTC DATETIME WHEN AVATAR'S SESSION STARTED.
- 510 — Zone1LeaveTime = UTC DATETIME WHEN AVATAR LEFT THE FIRST ZONE.
- 512 — Zone2EnterTime = UTC DATETIME WHEN AVATAR'S SESSION STARTED.
- 514 — Zone2LeaveTime = UTC DATETIME WHEN AVATAR LEFT THE SECOND ZONE.
- 516 — NumberOfZone1Enters = NUMERIC COUNTER OF HOW MANY TIMES AVATAR HAS ENTERED THE FIRST ZONE.
- 518 — NumberOfZone2Enters = NUMERIC COUNTER OF HOW MANY TIMES AVATAR HAS ENTERED THE SECOND ZONE.
- 520 — LastCoordinates = COORDINATE DATA OF WHERE THE AVATAR IS WITHIN THE ZONES.

*FIG. 5*

CONTEXTUAL TEMPLATES FOR MODIFYING OBJECTS IN A VIRTUAL UNIVERSE

This application is a continuation of and claims the benefit of priority to U.S. patent application Ser. No. 12/353,656, filed on Jan. 14, 2009, status pending and entitled "Contextual Templates for Modifying Objects in a Virtual Universe".

BACKGROUND OF THE INVENTION

1. Field of the Invention

The present invention is related generally to a data processing system and in particular to a method and apparatus for managing objects in a virtual universe. More particularly, the present invention is directed to a computer implemented method, apparatus, and computer usable program code for modifying a style of an object using predefined contextual templates.

2. Description of the Related Art

A virtual universe (VU), also referred to as a metaverse or "3-D Internet", is a computer-based simulated environment. Examples of virtual universes include Second Life®, Entropia Universe, The Sims Online®, There, and Red Light Center. Other examples of virtual universes include multiplayer online games, such as EverQuest®, Ultima Online®, Lineage®, and World of Warcraft® (WoW).

Many virtual universes are represented using three dimensional (3-D) graphics and landscapes. The properties and elements of the virtual universe often resemble the properties of the real world, such as in terms of physics, houses, and landscapes. Virtual universes may be populated by thousands of users simultaneously. In a virtual universe, users are sometimes referred to as "residents."

The users in a virtual universe can interact, inhabit, and traverse the virtual universe through the use of avatars. An avatar is a graphical representation of a user that other users in the virtual universe can see and interact with. The avatar's appearance is typically selected by the user and often takes the form of a cartoon-like representation of a human. However, avatars may also have non-human appearances, such as animals, elves, trolls, ores, fairies, and other fantasy creatures.

A viewable field is the field of view for a particular user. The viewable field for a particular user may include objects, as well as avatars belonging to other users. An object is an element in a virtual universe that does not represent a user. An object may be, for example, buildings, statues, billboards, signs, and advertisements in the virtual universe. Objects are prevalent in virtual universes and may be used for various purposes. However, the creation and maintenance of high quality virtual universe objects is frequently expensive and time consuming.

SUMMARY OF THE INVENTION

According to one embodiment of the present invention, a computer implemented method, apparatus, and computer usable program code is provided for modifying object styles in a virtual universe. An object is rendered in accordance with a first contextual style template from a plurality of contextual style templates. The first contextual style template comprises first geometric and texture data to display the object with a first style. In response to detecting a set of contextual changes associated with the object, a second contextual style template is identified from the plurality of contextual style templates. The set of contextual changes triggers implementation of the second contextual style template to change the first style of the object to a second style. The object is rendered in accordance with second geometric and texture data in the second contextual style template to form a modified object, wherein the modified object is displayed with the second style.

BRIEF DESCRIPTION OF THE DRAWINGS

FIG. 5 is a block diagram of an object avatar rendering table in accordance with an illustrative embodiment;

DETAILED DESCRIPTION OF THE PREFERRED EMBODIMENT

Figure 1:
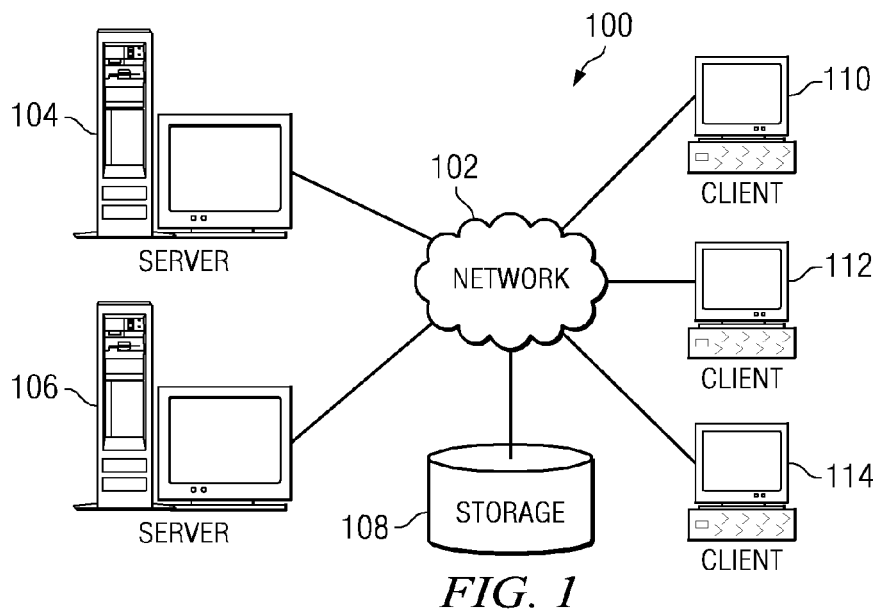
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
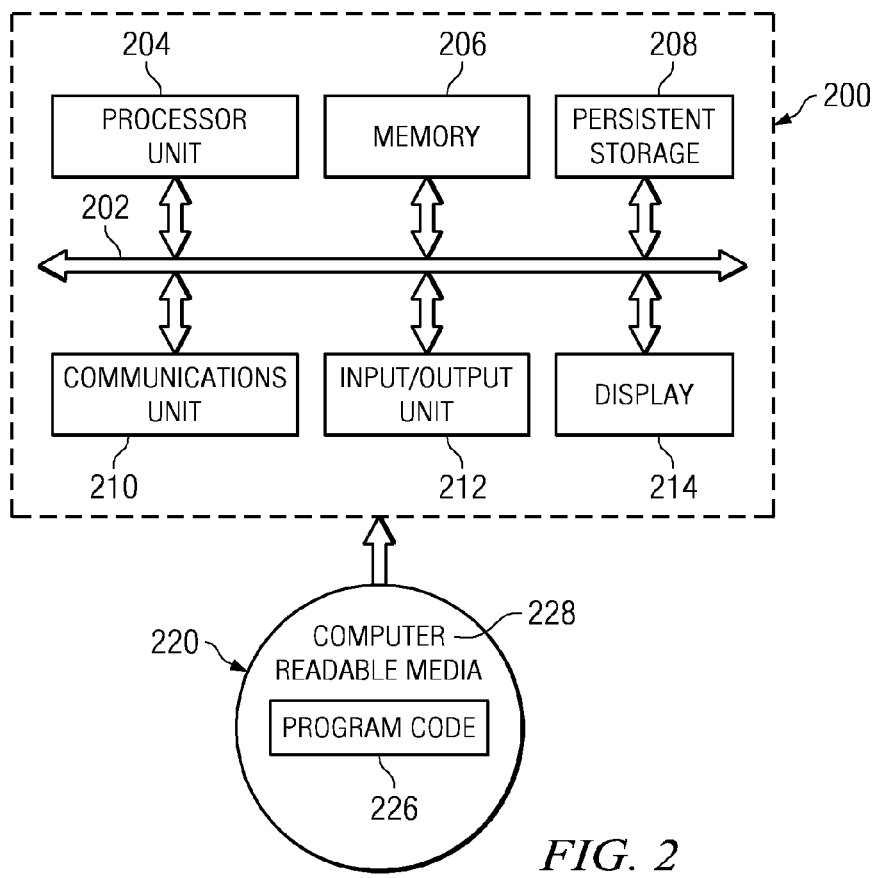
FIG. 2 is a diagram of a data processing system in accordance with an illustrative embodiment of the present invention.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. Servers 104 and 106 are servers associated with a virtual universe. Users of the virtual universe have agents on servers 104 and 106. An agent is a user's account. A user uses an agent to build an avatar representing the user. The agent is tied to the inventory of assets or possessions the user owns in the virtual universe. In addition, a region in a virtual universe typically resides on a single server, such as, without limitation, server 104. A region is a virtual area of land within the virtual universe.

Clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example.

In a virtual universe, assets, avatars, the environment, and anything visual consists of unique identifiers (UUIDs) tied to geometric data, textures, and effects data. Geometric data is distributed to a user's client computer as textual coordinates. Textures are distributed to a user's client computer as graphics files, such as Joint Photographic Experts Group (JPEG) files. Effects data is typically rendered by the user's client according to the user's preferences and the user's client device capabilities.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments. Network data processing system 100 may include additional servers, clients, and other devices not shown.

Turning now to FIG. 2, a diagram of a data processing system is depicted in accordance with an illustrative embodiment of the present invention. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 226 is located in a functional form on computer readable media 228 that is selectively removable and may be loaded onto or transferred to data processing system 200 for execution by processor unit 204. Program code 226 and computer readable media 228 form computer program product 220 in these examples. In one example, computer readable media 228 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 228 also may take the form of a persistent storage, such as a hard drive, a thumb drive, or a flash memory that is connected to data processing system 200. The tangible form of computer readable media 228 is also referred to as computer recordable storage media. In some instances, computer readable media 228 may not be removable.

Alternatively, program code 226 may be transferred to data processing system 200 from computer readable media 228 through a communications link to communications unit 210 and/or through a connection to input/output unit 212. The communications link and/or the connection may be physical or wireless in the illustrative examples. The computer readable media 228 also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

A virtual universe is a computer-simulated environment, such as, without limitation, Second Life®, Entropia Universe, The Sims Online®, There, Red Light Center, EverQuest®, Ultima Online®, Lineage®, and World of Warcraft®. A virtual universe is typically represented using three dimensional (3-D) graphics and landscapes.

The users in the virtual universe interact, inhabit, and traverse the virtual universe through avatars. Avatars represent users and are controlled or associated with users. A user can view objects and other avatars within a given proximity of the user's avatar. The virtual universe grid software determines which objects and other avatars are within the given proximity of the user's avatar according to the geometries and textures that are currently loaded in the user's virtual universe client. The virtual universe grid determines the length of time that a user views an object or other avatar in proximity of the user based on processing the data sent to each virtual universe client.

The illustrative embodiments recognize that objects are prevalent in virtual universes and objects may be used for various purposes, including advertising, product placement, and information dissemination. However, an object created for one particular purpose, such as advertising, may not be appropriate for a different purpose, such as product placement. In addition, a single object style may not be suitable for placement throughout the virtual universe. For example, consider a corporate logo object. For advertising purposes, the corporate logo object should be clearly readable and standout from the background. For other purposes, such as product placement, the logo should blend seamlessly with the background. A single corporate logo style for the object may be inappropriate to cover both these needs. The illustrative embodiments also recognize that the creation and maintenance of multiple, high quality versions of a virtual universe object may be expensive or cost prohibitive.

Therefore, according to one embodiment of the present invention, a computer implemented method, apparatus, and computer usable program code is provided for modifying object styles in a virtual universe. An object is rendered in accordance with a first contextual style template from a plurality of contextual style templates. The first contextual style template comprises first geometric and texture data to display the object with a first style. In a virtual universe, assets, avatars, the environment, and anything visual consists of unique identifiers (UUIDs) tied to geometric data and texture data. Geometric data is data associated with the form or shape of avatars and objects in the virtual universe. Geometric data may be used to construct a wire frame type model of an avatar or object. In other words, geometric data is used to create the shape or skeleton of the object. Texture data refers to the surface detail and surface textures or color that is applied to wire-frame type geometric data to render the object or avatar. The texture that is generated using texture data provides an outer appearance or "skin" of the object.

The geometric data and texture data may be created or modified to change the look and feel of the object. For example, and without limitation, geometric data may be modified to change a shape of the object to make the object larger and the texture data may be modified to change the color of the object to darker or bolder colors to give the object increased visibility and a bolder look and a more powerful feel. In another example, the geometric data for the object may be changed to soften edges and the texture data may be modified to change the object's colors to pastels or other soft colors to give the object a soft or relaxing look and feel.

In response to detecting a set of contextual changes associated with the object, a second contextual style template is identified from the plurality of contextual style templates. As used herein, the term "set" refers to one or more. Thus, the set of contextual changes may include a single contextual change, as well as two or more contextual changes. A contextual change is a condition or event associated with the object. A contextual change may include, without limitation, a change in a location of an object, a change in a number of avatars within a viewable field of the object, a real world identity of a user controlling an avatar within the viewable field of the object, characteristics of the real world user controlling the avatar within the viewable field of the object, and/or receiving a user selection to change the style of the object.

The set of contextual changes triggers implementation of the second contextual style template to change the first style of the object to a second style. The object is rendered in accordance with second geometric and texture data in the second contextual style template to form a modified object. The modified object is displayed with the second style. In one embodiment, the geometric data is distributed to a user's client computer as textual coordinates. Texture data may be distributed to a user's client computer as graphics files, such as JPEG files.

Figure 3:
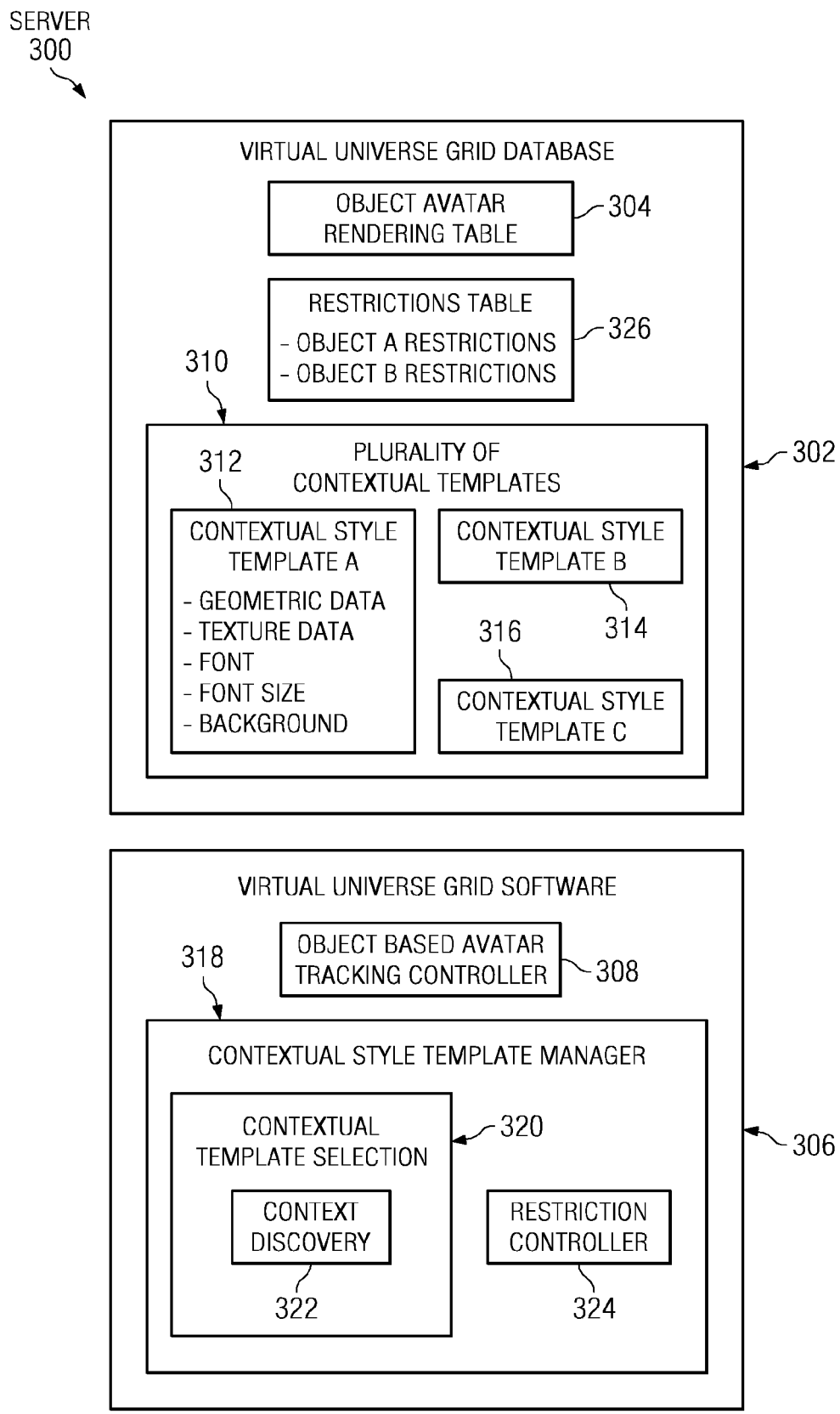
FIG. 3 is a block diagram illustrating a virtual universe grid server in accordance with an illustrative embodiment.

FIG. 3 is a block diagram illustrating a virtual universe grid server in accordance with an illustrative embodiment. Server 300 is a server associated with a virtual universe. Server 300 may be a single, stand-alone server, a server in a virtual universe grid computing system, or a server in a cluster of two or more servers. In this example, server 300 is a server in a grid computing system for rendering and managing a virtual universe.

Virtual universe grid database 302 is a database on the grid computing system for storing data used by virtual universe grid software 306 to render objects in the virtual universe and manage the virtual universe. Virtual universe grid database 302 includes object avatar rendering (OAR) table 304. Object avatar rendering table 304 stores object unique identifiers and avatar unique identifiers.

Object avatar rendering table 304 stores a unique identifier (UUID) for each selected object in the virtual universe. A selected object is an object in a plurality of objects in the virtual universe that is tracked, monitored, managed, or associated with object avatar rendering table 304. Thus, object avatar rendering table 304 may be used to track all the objects in the virtual universe or track one or more objects in the virtual universe that are selected. Object avatar rendering table 304 also stores unique identifiers and other data describing avatars within a viewable field of a selected object or within a selected zone or range associated with the selected object. For example, if the selected objects include object A and object B, then object avatar rendering table 304 stores object A unique identifier, object B unique identifier, avatar unique identifiers and other data for all avatars within the viewable field of object A, and avatar unique identifiers and other data describing all avatars within the viewable field of object B.

Virtual universe grid software 306 is software for rendering the virtual universe and the objects within the virtual universe. Virtual universe grid software 306 includes object based avatar tracking controller 308. Object based avatar tracking controller 308 is software for tracking avatars within the viewable field of each selected object. Object based avatar tracking controller 308 stores tracking data in object avatar rendering table 304. Tracking data includes the unique identifiers and other data describing avatars within the viewable field of a selected object. When object based avatar tracking controller 308 needs data from object avatar rendering table 304 to determine the number of avatars within the viewable field of an object, when an avatar enters the viewable field of an object, when an avatar leaves the viewable field of an object, or other tracking information associated with the object, object based avatar tracking controller 308 sends a query to object avatar rendering table 304. In response to the query, virtual universe grid database 302 sends the tracking data for the object to virtual universe grid software 306 for utilization by object based avatar tracking controller 308 to track avatars and identify contextual style templates.

Plurality of contextual templates 310 is a plurality of predefined templates for changing, modifying, or augmenting a style of an object. The object style provides a particular look and feel for an object. For example, and without limitation, contextual style template A 312 may provide a classic style for a soft drink can object. When contextual style template A 312 is implemented to render the soft drink can object, the object may be displayed with the soft drink manufacturer's classic corporate logo to provide a classic or corporate look and feel. Contextual style template B 314 may provide an athletic or health conscious style. For example, contextual style template B 314 may be implemented to render the soft drink can object with an hour glass shaped soft drink can, colors that are slightly brighter or more vibrant, and add the word "diet" or "natural" to the label to appeal to an athletic or health conscious consumer. Contextual style template C 316 may provide a youth style. For example, contextual style template C 316 may be selected and implemented to render the object to form the shape of a drink bottle with images of popular fictional characters from children's entertainment and employ bolder colors to appeal to children.

Plurality of contextual templates 310 may include two or more different contextual style templates. For example, and without limitation, plurality of contextual templates 310 may include a blending style to permit the object to blend inconspicuously into the background, a high visibility style to make the object noticeable or stand out from the background, a corporate style, a professional style, a youth style, a senior style, a classic style, a nostalgic style, a modern style, a holiday style, a trendy style, a movie theme style, a television program theme style, a toy style, a back-to-school style, a political style, a healthy style, a science fiction style, a comedy style, a sport style, a hobby style, a pet style, or any other type of style.

A contextual style template is a template comprising instructions for modifying or augmenting the object to display the object with a different style. The modifications in the set of instructions support a particular style. The set of instructions may be implemented as a table. The contextual style template may include, without limitation, geometric data, texture data, instructions to change a font type, instructions to change a font size, and/or instructions to modify a background of the object. The geometric data is used to change the wireframe or shape of the object. Texture data is used to change the color and texture of the outside or "skin" of the object. The font and/or font size instructions are used to change the letters, numbers, symbols, and/or characters that are displayed as part of the object. The contextual style template may include geometric and texture modifications to float the object, move the object along a fixed path, clone the object, change a size of the object, change one or more colors of the object, and/or change a shape of the object.

A contextual style template may be selected to modify the object to a holiday themed style in response to a change of date. For example, when the date changes and it is St. Patrick's Day, a contextual style template may be implemented to display the object in green colors and add four leaf clovers to the object to create a St. Patrick's Day style. If it is the month of December, a Christmas style object may be selected to display the object in colors of red and green. In another example, and without limitation, a change in context may include a particular number of avatars entering a viewable field of the object. When the given number of avatars is present, a contextual style template may be selected and implemented to modify the object to create a "reward" style that will make the object glow and create fireworks type graphics as a reward for having the given number of avatars present. In still another example, when a user having a real world identity that indicates the user is a health conscious consumer, a contextual style template may be selected and implemented to render the object with words like "all-natural," "diet," or "low-calorie," to appeal to the health conscious consumer.

A contextual style template may be used on a single object or multiple objects. Plurality of contextual templates 310 may include a set of contextual style templates that are assigned to each object or the contextual style templates may be assigned to multiple objects in the virtual universe. In other words, a given contextual style template may only be used to modify a single object or the contextual style template may be capable of being implemented to modify multiple different objects. The contextual style template may be used to modify the multiple different objects simultaneously or substantially at the same time or the contextual style template may be used to modify one or more objects at a given time. For example, the contextual style template may be used to modify a first object during a first time interval, modify a second and third object during a second time interval, and modify a fourth object during a third time interval.

Thus, objects are modified to support multiple styles. Styles include geometric data, textures, fonts, relative font sizes, restrictions, and background. Each style type created is mapped to a style supported by the virtual universe server 300. For example, a virtual universe may support a blend style and a high visibility style. If the newly defined style maps to the virtual universe's blend style, the associated textures, fonts, and relative font sizes are configured to permit the object to blend with most environments in which the object would be placed. Permitting multiple styles within a single object lowers associated costs with maintaining the object. Maintenance may include minor updates to textures, fonts, geometric data, and other components of the object. The creation of contextual style templates for an object may be performed with virtual universe specific objects creation and editing tools.

When a user creates a contextual style template, the user may identify particular components of the object for modification by the contextual style template. Objects are comprised of components such as fonts, textures, backgrounds, font sizes, and geometry. In one embodiment, a user identifies each component within an object that is to be modified by the contextual style template. Component identification may also be used by the rendering system to augment the component based on the selected rendering style. Identification may be completed with any virtual universe specific object creation and editing tool.

Contextual style template manager 318 is a software component for creating, managing, identifying, selecting, and/or implementing contextual style templates to modify the styles of the objects. When an object is being rendered for the first time, contextual template selection 320 identifies a first contextual template for implementation to display the object with an initial style. The first contextual style template may be a default template. In another embodiment, the first contextual style template may be a template selected by a user via a user input/output device.

For style rendering, contextual style template manager 318 discovers the context of the object placement and selects contextual style templates for implementation to modify the style of one or more objects based on the discovered context. Context discovery 322 is a software component for monitoring changes in context associated with the object. Context changes may include, without limitation, an avatar entering a viewable field of the object, an avatar leaving a viewable field of the object, a real world identity of a user controlling an avatar that is within the viewable field of the object or within a detection area of the object, a real world characteristic of one or more users controlling one or more avatars within the viewable field of the object or the detection area of the object, a time of day, a day of the week, a holiday, or any other change. A real world characteristic may include, without limitation, a profession of a user, a residence of a user, a citizenship of a user, a current location of a user, an age of the user, a sex of the user, a hobby of the user, a past purchase history of the user, a membership of the user in an organization, club, loyal customer group, or any other membership, a marital status of the user, an educational or employment status, a credit history or credit rating, or any other characteristic of the user.

Context discovery 322 may utilize tracking data and real world user information to determine when an avatar enters the viewable field or detection area of the object, when an avatar leaves the viewable field or detection area of the object, and/or determine real world characteristics of the users controlling the avatars that are within the viewable field or the detection area of the object.

In another embodiment, if the context change is associated with environment surrounding the object, context discovery 322 samples and averages the colors in the environment immediately surrounding the object. For example, if an object is moving or changing location, the object may need to be modified in accordance with a blend style to blend in with the new environment. In such a case, context discovery 322 averages individual color values for the area surrounding the object's location.

For example context discovery 322 may average the values for red, green and blue color values surrounding the object. Additionally, the designation of the surrounding area to be sampled may be a predefined area or an area that is proportional to the size of the object being placed. For example, if the object is two centimeters in width and two centimeters in height, context discovery 322 samples an area that is equal to the object area squared, for this example, context discovery 322 samples sixteen centimeters around the location where the object will be placed or is placed.

The contextual style templates may require restrictions on all or parts of the object to restrict the automatic modification of the object in accordance with the instructions in a given contextual style template. Restrictions may be required to maintain corporate identity or personal taste. For example, some corporations only permit the corporate logo to be rendered in a specific font or colors. The restrictions placed on the object or components of the object affect the available object mutations for each renderable style.

Restriction controller 324 is software for restricting the changes or modifications made to a particular object in accordance with restrictions table 326. Restrictions table 326 is a table of limitations on the changes that are allowed to be made on a particular object. For example, an object that is a soft drink logo may include a restriction that limits color changes on the logo to a range of red colors and white colors. The restrictions may prohibit the logo being displayed in the color black, brown, purple, orange, or any color other than the approved range of reds and whites. When a contextual style template is implemented to modify an object, restriction controller 324 checks restrictions table 326 to determine whether the changes implemented by the contextual style template are permitted. For example, if contextual style template C 316 is a Christmas style that includes instructions to change the letter "l" to a red and white candy cane and a restriction in restrictions table 326 does not permit modification of the font style or font color, restriction controller 324 will not permit that change to the letter "l" to be made. The selection of restrictions for an object may be performed with virtual universe specific object creation and editing tools to create restrictions table 326.

The rendering restrictions may impact the color selection, textures, and other modifications to an object for each supported style that is available in plurality of contextual templates 310. When rendering an object, the choice of colors, textures, font colors, font sizes, and other components, are selected so as to not conflict with any of the objects rendering restrictions. It should be noted that rendering restrictions in restrictions table 326 for a particular object component may have a cascading effect on the rendering selections for one or more other components of the object. For example, if a background component is restricted to one color which is not appropriate for the selected style, another unrestricted component may be modified to maintain adherence to the selected style.

In one embodiment, when a contextual object is initially placed in a virtual universe, the user chooses an initial style for the object by manually selecting a contextual style template from a set of contextual templates in plurality of contextual templates 310 that are available for utilization on the object. The user may select the contextual style template using a context menu or responding to prompts presented by contextual style template manager 318 via a user input/output interface.

In another embodiment, if the context surrounding an object placement is modified, a contextual style template may be invoked to update the object. Context updates include, without limitation, changing the wall color an object is placed on, moving the object to a new location, or any other context change.

Figures 4, 8:
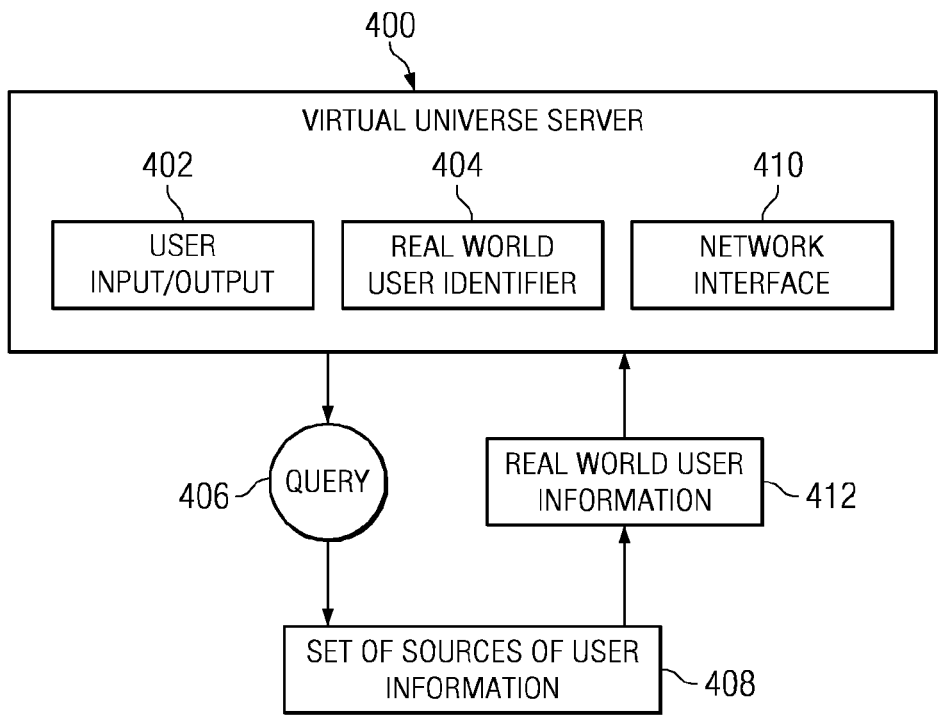
FIG. 4 is a block diagram illustrating a real world user identifier in accordance with an illustrative embodiment.
FIG. 8 is a block diagram of a restrictions table in accordance with an illustrative embodiment.

Turning now to FIG. 4, a block diagram illustrating a real world user identifier is shown in accordance with an illustrative embodiment. Virtual universe server 400 is a server that includes virtual universe grid software for creating and managing a virtual universe and objects in a virtual universe. Virtual universe server 400 includes user input/output 402, which may be implemented in any type of user interface for receiving user input and providing output to the user, such as, without limitation, a graphical user interface, a command line interface, a menu driven interface, a keyboard, a mouse, a touch screen, a voice-recognition system, or any other type of input/output device.

A user may use user input/output 402 to select a default contextual style template for use in rendering an object and/or select a contextual style template for implementation to change a style of the object. For example, if the object is being displayed with a modern style, the user may manually select a classic or retro style for the object, rather than waiting for the contextual style template to be automatically selected when a context change is detected.

Real world user identifier 404 is software for determining a real world identity of a user controlling an avatar and/or determining real world characteristics of the user controlling the avatar. Real world user identifier 404 sends query 406 to set of sources of user information 408 to obtain an identity and/or other information describing the real world identity and real world characteristics of the user. Query 406 may be a single query to a single source of user information, as well as two or more queries to one or more different sources of user information.

Set of sources of user information 408 is a set of one or more sources of user information. Set of sources 408 may include both online sources of information and offline sources of information. Offline sources of information include, without limitation, information manually provided by a user and/or information retrieved from one or more local data storage devices. Online sources of information may include information stored on one or more remote data storage devices that are accessed via a network connection and/or information provided by a user from a remote location. Virtual universe server 400 obtains information from one or more remote information sources in set of sources of user information 408 via a network connection provided by network interface 410.

Network interface 410 is any type of network access software known or available for allowing virtual universe server 400 to access a network. Network interface 410 connects to a network connection, such as network 102 in FIG. 1. The network connection permits access to any type of network, such as a local area network (LAN), a wide area network (WAN), the Internet, an Ethernet, an intranet, a virtual private network (VPN), or any other type of network.

Virtual universe server 400 receives real world user information 412 from set of sources of user information 408 in response to query 406. Real world user information 412 may include a real world identity of the user and/or characteristics of the user. The contextual style template manager in the virtual universe grid software may use real world user information 412 to select contextual style templates for implementation to change the style of one or more objects being displayed in the virtual universe.

FIG. 5 is a block diagram of an object avatar rendering table in accordance with an illustrative embodiment. Object avatar rendering table 500 is an example of data in an object avatar rendering table, such as object avatar rendering table 304 in FIG. 3.

RenderingUUID 502 is a primary key for object avatar rendering table 500. ObjectUUID 504 is a unique identifier for a selected object in a virtual universe. Object UUID 504 is a foreign key to the existing object table. AvatarUUID 506 is a foreign key to an existing avatar table. AvatarUUID 506 includes a unique identifier for each avatar in the viewable field of the object associated with objectUUID 504.

Zone1EnterTime 508 is a field of a date and/or time when an avatar enters a first zone within the viewable field of an object. In this example, the zone 1 enter time is a time when an avatar entered the first zone, assuming a model with two or more zones. Zone1LeaveTime 510 is a field for a date and/or time when the avatar leaves the first zone. Zone2EnterTime 512 is a field in object avatar rendering table 500 for storing a date and/or time when an avatar enters a second zone. The second zone may be an area that is outside the viewable field. In other words, the second zone is an area in which an avatar cannot see the selected object, but the area is in close proximity to the viewable field in which the avatar will be able to see the object. Thus, when an avatar enters the second zone, the object avatar tracking controller software may begin preparing to display the object to the avatar when the avatar does eventually enter the viewable field.

Zone2LeaveTime 514 is a field for storing the date and/or time when a given avatar leaves the second zone. NumberofZone1Enters 516 is a field for storing the number of times a particular avatar has entered the first zone. This information may be useful to determine whether the user has never viewed the object. If the user has never before viewed the object, it may be determined that content associated with an object should be displayed in full to the user associated with the avatar, rather than in an abbreviated or summarized form. The information in NumberofZone1Enters 516 is also used to determine whether the user has viewed the object one or more times in the past, and therefore, the content associated with the object should be displayed in part, skip introductory material, be modified or abbreviated, or otherwise altered so that the exact same content is not displayed to the user every time the user is within the viewable field of the object.

NumberofZone2Enters 518 is a field for storing the number of times an avatar has entered the second zone. LastCoordinates 520 is a field for storing the coordinate data describing where a given avatar is within the first zone or the second zone of a selected object. The coordinate data is typically given in xyz type coordinate data.

The illustrative embodiments recognize that a user may wish to change the style or look and feel of an object based on circumstances, such as, the number of avatars viewing an object, the real world identities or characteristics of users controlling the avatars within the viewable field of the object, whether the object is being displayed to avatars on a holiday, weekend, or workday, whether the object is being displayed during daylight hours or during the evening or night, and other information describing the context in which the object is being viewed.

Figure 6:
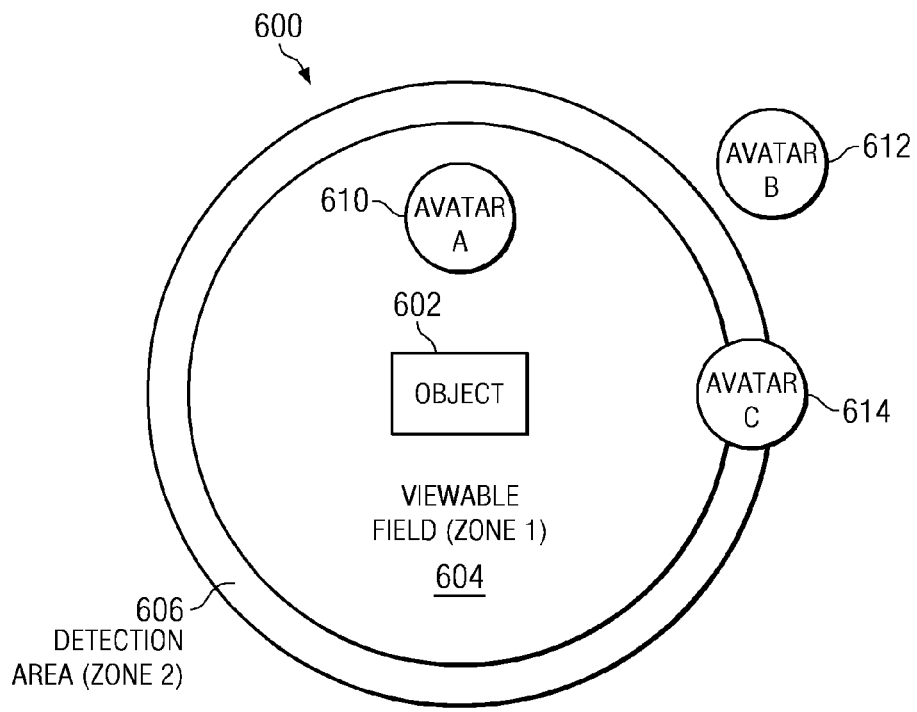
FIG. 6 is a block diagram of a viewable area for an object in accordance with an illustrative embodiment.

FIG. 6 is a block diagram of a viewable area for an object in accordance with an illustrative embodiment. Range 600 is a viewable field 604 and detection area 606 associated with object 602 in a virtual universe. An object, such as object 602, is an element in a virtual universe that is not directly controlled by a user or associated with a user's account. An object may be, for example and without limitation, a building, a statue, a billboard, a sign, a drink bottle, a logo, a box, a container, or an advertisement in the virtual universe. In this example, object 602 is an advertisement, such as a billboard or a sign.

Viewable field 604 has a focal point or center at a location that is the same as the location of object 602. Viewable field 604 may also be referred to as zone 1 or a first zone. An avatar in viewable field 604 is able to see or view object 602 and/or content associated with object 602. For example, object 602 may be associated with video and/or audio content. Object 602 may also optionally be capable of some movement or animation. However, in this example, object 602 is substantially limited to a single location in the virtual universe.

Object 602 is rendered on a user's screen when an avatar associated with the user is within viewable field 604. Object 602 is rendered using any perspective mode, including but not limited to, a first person perspective, a third person perspective, a bird's eye view perspective, or a map view perspective. A map view perspective renders objects with labels rather than with extensive details and/or texturing.

Detection area 606 is an area adjacent to viewable field 604 within range 600. Detection area 606 may also be referred to as a second zone or zone 2. An avatar in detection area 606 cannot see object 602 or view content associated with object 602. However, when an avatar enters detection area 606, the object avatar tracking controller software can begin preparing to display object 602 and content associated with object 602 to the avatar when the avatar enters viewable field 604.

In this example, avatar A 610 is within viewable field 604. Therefore, avatar A 610 is able to view or see object 602. Avatar C 614 is within detection area 606. Avatar C 614 is not able to see or view object 602. However, the presence of avatar C 614 indicates that avatar C 614 may be about to enter viewable field 604 or that avatar C 614 has just left viewable field 604. Avatar B 612 is outside range 600. Avatar B 612 is not able to see or view object 602. In addition, avatar B 612 is not close enough to viewable field 604 to indicate that avatar B 612 may be preparing to enter viewable field 604. Therefore, an object avatar tracking table for object 602 includes entries for avatar A 610 in zone 1 and avatar C 614 in zone 2. However, in this example, the record associated with object 602 in the object avatar rendering table does not include an avatar unique identifier or data for avatar B 612 because avatar B 612 is outside both viewable field 604 and detection area 606.

Figure 7:
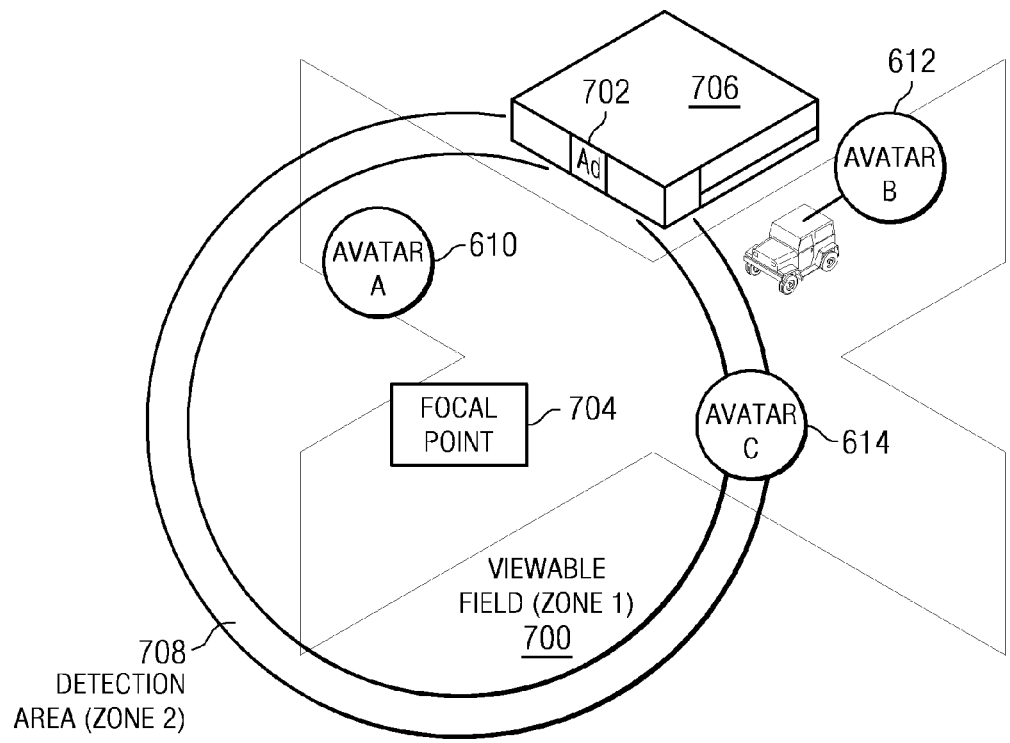
FIG. 7 is a block diagram of a viewable area for an object having a focal point at a location other than the location of the object in accordance with an illustrative embodiment.

FIG. 7 is a block diagram of a viewable area for an object having a focal point at a location other than the location of the object in accordance with an illustrative embodiment. Viewable field 700 is a viewable field for object 702. In this example, object 702 is an advertisement in front of object 706. Viewable field 700 is a range in which an avatar, such as avatars 610-614, may view object 706. An avatar can see object 702 if the avatar is within viewable field 700.

Viewable field 700 has focal point 704. Focal point 704 is a point from which the range or area of viewable field 700 for object 702 is determined. In other words, viewable field 700 is an area that is identified based on a predetermined radius or distance from focal point 704. Here, focal point 704 is a location that is different from the location of object 702 because object 702 is adjacent to an obstructing object. In this example, the obstructing object is object 706.

In this example, when avatar C 614 comes in range of detection area 708 of object 702, object based avatar tracking controller, such as object based avatar tracking controller 308 in FIG. 3, makes a determination as to whether there is an existing session associated with the unique identifier of object 702 and the unique identifier of avatar C 614. This step may be implemented by making a query to the object avatar rendering table to determine if avatar C 614 has ever entered zone 2 or zone 1 previously. If there is not an existing session for avatar C 614, the object based avatar tracking controller creates a record in the object avatar rendering table with the unique identifier of object 702 and the unique identifier of avatar C 614.

The record in the object avatar rendering table may optionally include additional information, such as, without limitation, a date and time when avatar C 614 entered zone 2, a date and time when avatar C 614 leaves zone 2, a date and time when avatar C 614 enters zone 1, a number of zone 2 enters, a number of zone 1 enters, coordinates of avatar C 614, and any other data describing avatar C 614. This data is used by the virtual universe grid software for analysis, reporting, and billing purposes.

Object 702 may have an initiation process associated with object 702. For example, if object 702 is an advertisement with an audio and video content associated with viewing object 702, an initiation process may include buffering the audio and/or video content, checking a cache for the audio and/or video content, caching the audio and/or video content, or any other initiation process.

When avatar C 614 enters detection area 708, the object-based avatar tracking controller triggers any object initiation process defined by object 702. When avatar C 614 enters viewable field (zone 1) 700, the object based avatar tracking controller displays the buffered or cached content. If a user is viewing the object for the first time and object 702 has a video or audio file associated with viewing the object, the process starts playing the video or audio from the beginning.

If a session already exists, the object based avatar tracking controller triggers any object re-initiation process defined by object 702. For example, if the user is not viewing an object with an associated video for the first time, the process starts playing the video at a point in the video after the beginning, such as after an introduction, in a middle part, or near the end of the video to avoid replaying introductory material.

The object based avatar tracking controller makes a determination as to whether the position of avatar C 614 has changed. Changing position may include traveling, turning, walking, or disappearing, such as teleporting, logging off, or disconnecting. When avatar C's 614 position changes, the object based avatar tracking controller adds the user position data to the object avatar rendering table, such as at a field for LastCoordinates 520 in FIG. 5. The user position data includes angle of view coordinate data of the avatar relative to object 702 and the distance of avatar C 614 to object 702.

The object based avatar tracking controller performs an analysis of the position data and modifies object 702 according to one or more geometric and texture modification methods (GTMs) to improve visibility of the object.

When avatar C 614 is out of range of viewable field 700 and detection area 708 the object based avatar tracking controller logs a session pause for the session associated with avatar C 614. The log may include the date and time of the session pause. When the session has been paused for an amount of time that exceeds a threshold amount of time, the object based avatar tracking controller terminates the session associated with avatar C 614. The process termination may include, without limitation, removing the records and data associated with avatar C 614 from the object avatar rendering table. If the record is not deleted, when avatar C 614 comes back into range of zone 1 or zone 2 of object 702, the object based avatar tracking controller determines that an existing session associated with the unique identifier of object 702 and a unique identifier of avatar C 614 already exists. In such a case, a new record for avatar C 614 will not be created. Instead, the data in the object based avatar rendering table will be updated with new data regarding avatar C 614 in the range of object 702.

FIG. 8 is a block diagram illustrating a restrictions table in accordance with an illustrative embodiment. Restrictions table 800 is a table of restrictions that limit the changes that are made to a particular object when each contextual style template is implemented to modify the object, such as restrictions table 326 in FIG. 3.

Restrictions table 800 in this example limits changes to font colors white 802, blue 804, and red 806 based on the style rendered in accordance with the selected contextual style template. For example, if a first contextual style template is implemented to create a blend style, restriction table 800 limits changes of the font color white 802 to either white or grey. If a second contextual style template is selected to create a high visibility style, restriction table 800 limits changes of the font color white to blue or red. In this example, the style modifications and the restriction data is represented with colors as opposed to number ranges corresponding with the colors for illustrative purposes only. In one embodiment, restrictions table 800 comprises number ranges corresponding to the colors. In addition, while restriction table 800 lists textual associations for styles and colors, it should be noted that mathematical functions may be derived for color ranges permitting selection of colors with explicit declaration.

Rendering restrictions in restrictions table 800 for a particular object component may have a cascading effect on the rendering selections for one or more other components of the object. For example, if a background component is restricted to one color which is not appropriate for the selected style, another unrestricted component may be modified to maintain adherence to the selected style. In this example, the object may be restricted to a blue background. If the object is placed in a predominately blue context and the high visibility style is selected, the restrictions on blue context color 804 may prevent utilization of the red or yellow color as a background selection. Therefore, the background may remain blue but the font color may be augmented to red or yellow to create a high visibility style rather than changing the background color. In another example, a combination of restrictions may exist such that the selected style is not possible, the user is notified that the selected style cannot be implemented in the placed context due to the restrictions. Rendering restrictions table 800 may include absolute restrictions that enforce restrictions regardless of context. For example, a restriction record may prevent any context and any style from changing an object's color to green.

Figure 9:
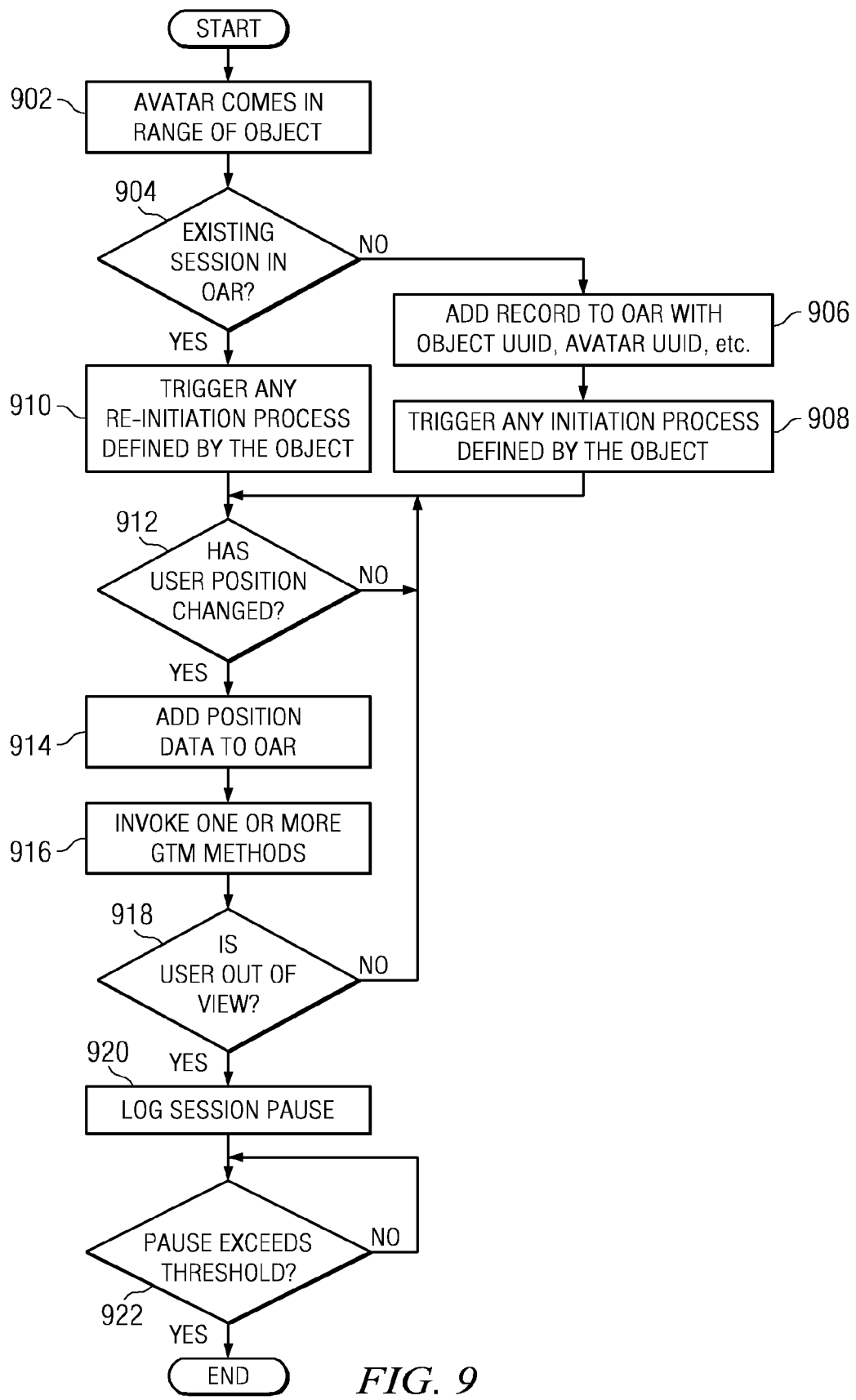
FIG. 9 is a flowchart illustrating a process for object based avatar tracking using object avatar rendering tables in accordance with an illustrative embodiment.

FIG. 9 is a flowchart illustrating a process for object based avatar tracking using object avatar rendering tables in accordance with an illustrative embodiment. The process in FIG. 9 is implemented by software for tracking avatars in a range of an object, such as object based avatar tracking controller 308 in FIG. 3.

The process begins when an avatar comes in range of the object (step 902). A determination is made as to whether there is an existing session associated with the unique identifier of the object and the unique identifier of the avatar (step 904). This step may be implemented by making a query to the object avatar rendering table for the object. If there is not an existing session, the process creates a record in the object avatar rendering table with the unique identifier of the object and the unique identifier of the avatar (step 906). The record in the object avatar rendering table may include other information, such as, without limitation, a date and time, which can be used for analysis, reporting, and billing purposes.

The process triggers any object initiation process defined by the object (step 908). For example, if a user is viewing the object for the first time and the object has a video associated with viewing the object, the process starts playing the video from the beginning.

Returning to step 904, if a session already exists, the process triggers any object re-initiation process defined by the object (step 910). For example, if the user is not viewing an object with an associated video for the first time, the process starts playing the video at a point in the video after the beginning, such as after an introduction, in a middle part, or near the end of the video to avoid replaying introductory material.

The process makes a determination as to whether the user's position has changed (step 912). Changing position may include traveling, turning, or disappearing, such as teleporting, logging off, or disconnecting. If the user's position has not changed, the process returns to step 912. The process may return to step 912 if the user's position does not change within a specified amount of time. The specified amount of time may be configured by the virtual universe grid administrator or object owner. The specified amount of time may occur very frequently, such as, without limitation, after a specified number of seconds or after a specified number of milliseconds.

When the user's position changes at step 912, the process adds the user position data to the object avatar rendering table (step 914). The user position data includes angle of view coordinate data of the avatar relative to the object and distance of the avatar to the object. The process then performs an analysis of the position data and modifies the object according to one or more geometric and texture modification methods (GTMs) (step 916) to improve visibility of the object.

The process then makes a determination as to whether the user is out of view (step 918). The user may be out of view if the user or the user's avatar has disappeared or is no longer facing the object. If the user is not out of view, after a specified amount of time the process returns to step 912. The specified amount of time may be configured by the virtual universe grid administrator or object owner. The specified amount of time may be, without limitation, a specified number of seconds or a specified number of milliseconds.

If the user is out of view at step 918, the process logs a session pause (step 920). The log may include the date and time. Next, the process makes a determination as to whether the session has been paused for an amount of time that exceeds a threshold amount of time (step 922). The threshold amount of time may be configured by a virtual universe administrator or object owner. If the pause does not exceed the threshold, the process returns to step 922. When the pause exceeds the threshold, the process terminates thereafter.

The process termination may include, without limitation, removing the records of the avatar from the object avatar rendering table. If the record is not deleted, when the avatar comes back into range of the object at step 902, the process will make a determination at step 904 that an existing session associated with the unique identifier of the object and a unique identifier of the avatar already exist.

Figure 10:
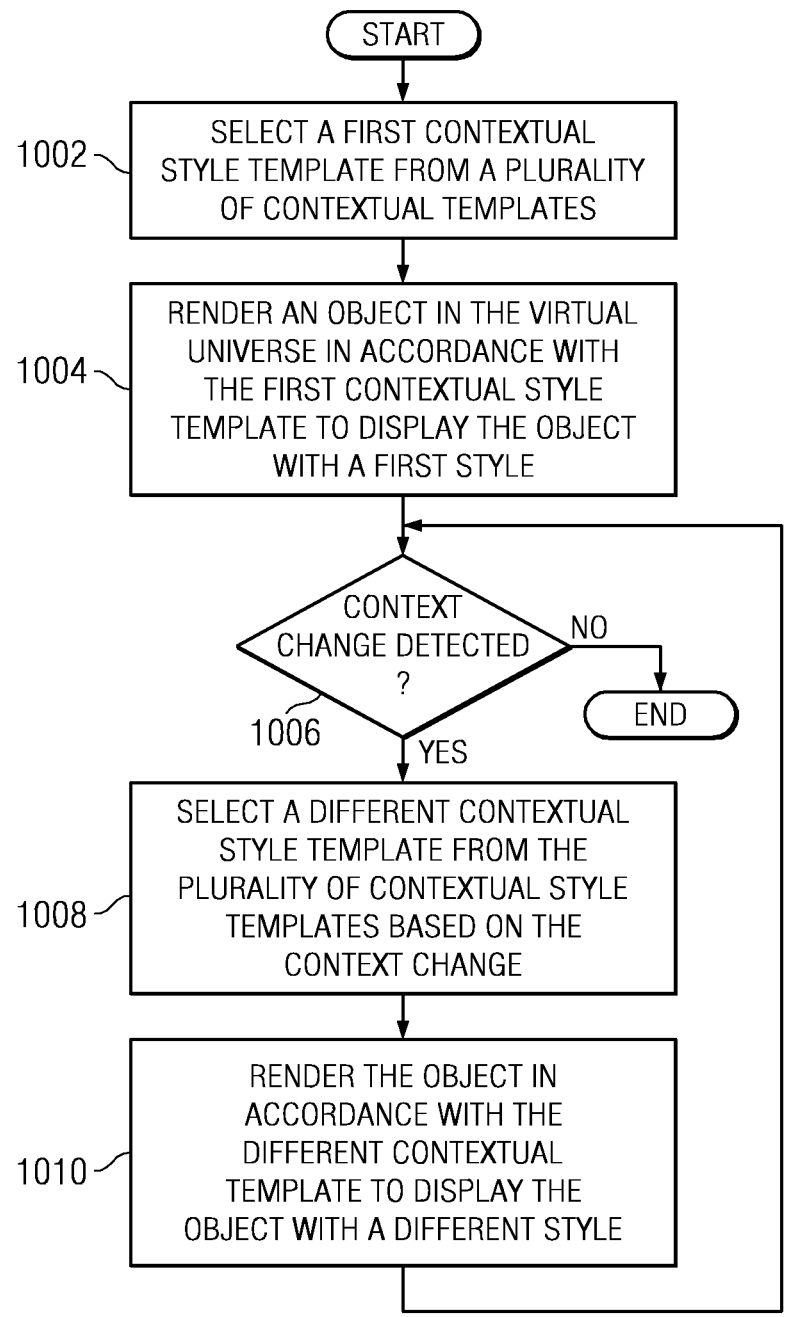
FIG. 10 is a flowchart illustrating a process for modifying the style of an object in a virtual universe using contextual style templates in accordance with an illustrative embodiment.

FIG. 10 is a flowchart illustrating a process for modifying the style of an object in a virtual universe using contextual style templates in accordance with an illustrative embodiment. The process in FIG. 10 may be implemented by software for identifying a contextual style template based on a context change associated with the object.

The process begins by selecting a first contextual style template from a plurality of contextual style templates (step 1002). The first contextual template may be a default contextual template or a contextual template selected by a user. The process renders an object in the virtual universe in accordance with the first contextual style template to display the object with a first style (step 1004). The process makes a determination as to whether a context change associated with the object is detected (step 1006). If a context change is detected, the process selects a different contextual style template from the plurality of contextual style templates based on the context change (step 1008). The process renders the object in accordance with the different contextual style template (step 1010). The process then returns to step 1006 and determines if another context change has been detected. If another context change occurs, the process selects another different contextual style template from the plurality of contextual style templates and renders the object in accordance with the selected different contextual style template. This process iteratively implements steps 1006-1010 until a context change is no longer detected. When a context change is not detected, the process terminates. The process may be terminated if a context change is not detected within a predetermined period of time One embodiment provides a computer implemented method, apparatus, and computer program product of modifying object styles in a virtual universe. An object is rendered in accordance with a first contextual style template from a plurality of contextual style templates. The first contextual style template comprises first geometric and texture data to display the object with a first style. In response to detecting a set of contextual changes associated with the object, a second contextual style template is identified from the plurality of contextual style templates. The set of contextual changes triggers implementation of the second contextual style template to change the first style of the object to a second style. The object is rendered in accordance with second geometric and texture data in the second contextual style template to form a modified object, wherein the modified object is displayed with the second style.

The predefined contextual style templates allow a single object to be created that may be used for a plurality of purposes and placements. The object is modified in accordance with a contextual style template to automatically alter the object's properties to create a different style and appearance of the object to enable the object to be used for multiple purposes and placements within the virtual universe. Furthermore, a restriction table provides restrictions on object alteration to prevent a contextual style template from altering the object in a manner that may conflict with corporate identity, trademark and trade dress, personal preferences, or other aesthetic goals. The contextual style templates reduce the cost of creating virtual universe objects and lower the cost of maintaining virtual universe objects. In other words, the predefined plurality of contextual style templates that are created for objects in a virtual universe reduces the costs of creating and maintaining virtual objects by supporting multiple object styles and modifying the rendering characteristics of objects based on selected style and object context. The modifications may be performed dynamically as the context is changing or statically.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for modifying object styles in a virtual universe, the method comprising the steps of:
    a computer modifying an object in the virtual universe in accordance with a first template of a plurality of templates, wherein each template in the plurality of templates comprises instructions for modifying the object, and wherein the step of the computer modifying the object in accordance with the first template comprises the computer using data included in the first template to change a shape, a color, and a texture of the object;
    the computer rendering, in the virtual universe, the object as modified in accordance with the first template;
    the computer detecting a movement of a particular avatar in the virtual universe from a detection area into a field of view that includes the object, wherein the movement of the particular avatar into the field of view is a particular contextual change that is included in a set of contextual changes associated with the object, and still further wherein the detection area is adjacent to the field of view;
    after the step of the computer detecting the movement of the particular avatar from the detection area into the field of view, the computer identifying a second template of the plurality of templates;
    the computer modifying the object in accordance with the second template, wherein the step of the computer modifying the object in accordance with the second template comprises the computer using data included in the second template to change the shape, the color, and the texture of the object;
    the computer rendering, in the virtual universe, the object as modified in accordance with the second template; and
    responsive to any avatar moving from an outside zone that is adjacent to the detection area into the detection area:
        the computer triggering an initiation process;
        wherein, during the initiation process, the computer begins preparations to display the object to the avatar when the avatar moves into the detection area without displaying the object during the preparations;
        wherein the avatar is incapable of viewing the object while the avatar is in the detection area; and
    the computer identifying the field of view using a focal point that is different from a location of the object, wherein the field of view is an area that is within a predetermined radius from the focal point.

2. The method of claim 1, wherein the computer begins the preparations by buffering content associated with the object, and wherein the method further comprises the step of the computer displaying the buffered content when the avatar moves into the field of view.

3. The method of claim 1, wherein the computer begins the preparations by checking a cache for content associated with the object.

4. The method of claim 1, wherein the computer begins the preparations by caching content associated with the object, and wherein the method further comprises the step of the computer displaying the cached content when the avatar moves into the field of view.

5. The method of claim 1, wherein the second template includes instructions for at least one of floating the object, moving the object along a fixed path, cloning the object, changing a size of the object, changing the texture of the object, changing a background of the object, changing a font size associated with the object, and changing the color of the object.

6. The method of claim 1, further comprising the steps of:
the computer determining a real world identity of a user that is controlling a second avatar that is in the field of view and within a particular proximity of the object;
the computer identifying characteristics of the user;
the computer using the characteristics to select a third template of the plurality of templates; and
the computer modifying the object in accordance with the third template.

7. The method of claim 1, wherein the second template provides a style selected from the group consisting of a blend style, a high visibility style, a corporate style, a youth style, a modern style, a classic style, and a holiday style.

8. The method of claim 1, further comprising the step of:
the computer retrieving a set of restrictions for the object;
wherein the step of the computer modifying the object in accordance with the second template comprises the computer limiting the modifying according to the set of restrictions.

9. The method of claim 1, wherein the object includes a plurality of components, and wherein the step of the computer modifying the object in accordance with the second template comprises the computer modifying a set of components in the plurality of components.

10. The method according to claim 1, further comprising the steps of:
the computer determining, responsive to the computer detecting a movement of the particular avatar into the detection area, whether a session exists;
responsive to the computer determining that a session does not exist:
the computer adding a record to a table, wherein the record includes a unique identifier of the particular avatar and a unique identifier of the object; and
the computer triggering the initiation process, wherein content associated with the object will be displayed starting at a beginning of the content when the particular avatar moves into the field of view.

11. The method of claim 10, further comprising the steps of:
the computer determining that the particular avatar is not facing the object; and
after the step of the computer determining that the particular avatar is not facing the object, the computer removing the record from the table.

12. The method according to claim 10, wherein the record includes a first field to store a numeric count of a first number of times the particular avatar has entered the field of view, a second field to store a numeric count of a second number of times the particular avatar has entered the detection area, and a third field to store last coordinates that identify a location of the particular avatar in a range of the object.

13. The method of claim 1, further comprising the step of:
the computer including a link to a table, wherein a first plurality of unique identifiers of avatars are included in the table, wherein each one of the first plurality of unique identifiers of avatars identifies a different one of a plurality of avatars that are in the field of view, wherein the first plurality of unique identifiers of avatars includes the unique identifier of the particular avatar.

14. A computer program product for modifying object styles in a virtual universe, the computer program product comprising:
one or more computer-readable tangible storage devices;
program instructions, stored on at least one of the one or more storage devices, to modify an object in the virtual universe in accordance with a first template of a plurality of templates, wherein each template in the plurality of templates comprises instructions to modify the object, and wherein the program instructions to modify the object in accordance with the first template comprise program instructions to use data included in the first template to change a shape, a color, and a texture of the object;
program instructions, stored on at least one of the one or more storage devices, to render, in the virtual universe, the object as modified in accordance with the first template;
program instructions, stored on at least one of the one or more storage devices, to detect a movement of a particular avatar in the virtual universe from a detection area into a field of view that includes the object, wherein the movement of the particular avatar into the field of view is a particular contextual change that is included in a set of contextual changes associated with the object, and still further wherein the detection area is adjacent to the field of view;
program instructions, stored on at least one of the one or more storage devices, to identify a second template of the plurality of templates after detecting the movement of the particular avatar from the detection area into the field of view;
program instructions, stored on at least one of the one or more storage devices, to modify the object in accordance with the second template, wherein the program instructions to modify the object in accordance with the second template comprise program instructions to use data included in the second template to change the shape, the color, and the texture of the object;
program instructions, stored on at least one of the one or more storage devices, to render, in the virtual universe, the object as modified in accordance with the second template;
program instructions, stored on at least one of the one or more storage devices, responsive to any avatar moving from an outside zone that is adjacent to the detection area into the detection area, to trigger an initiation process;
program instructions, stored on at least one of the one or more storage devices, to, during the initiation process, begin preparations to display the object to the avatar when the avatar moves into the detection area without displaying the object during the preparations, and wherein the avatar is incapable of viewing the object while the avatar is in the detection area; and program instructions, stored on at least one of the one or more storage devices, to identify the field of view using a focal point that is different from a location of the object, wherein the field of view is an area that is within a predetermined radius from the focal point.

15. The computer program product of claim 14, wherein the program instructions to begin the preparations to display the object to the avatar comprise program instructions to begin the preparations to display the object to the avatar by buffering content associated with the object, and wherein the computer program product further comprises program instructions, stored on at least one of the one or more storage devices, to display the buffered content when the avatar moves into the field of view.

16. The computer program product of claim 14, wherein the program instructions to begin the preparations to display the object to the avatar comprise program instructions to begin the preparations to display the object to the avatar by checking a cache for content associated with the object.

17. The computer program product of claim 14, wherein the program instructions to begin the preparations to display the object to the avatar comprise program instructions to begin the preparations to display the object to the avatar by caching content associated with the object, and wherein the computer program product further comprises program instructions, stored on at least one of the one or more storage devices, to display the cached content when the avatar moves into the field of view.

18. A computer system for modifying object styles in a virtual universe, the computer system comprising:
   one or more processors, one or more computer-readable memories and one or more computer-readable tangible storage devices;
   program instructions, stored on at least one of the one or more storage devices for execution by at least one of the one or more processors via at least one of the one or more memories, to modify an object in the virtual universe in accordance with a first template of a plurality of templates, wherein each template in the plurality of templates comprises instructions for modifying the object, and wherein the program instructions to modify the object in accordance with the first template comprise program instructions to use data included in the first template to change a shape, a color, and a texture of the object;
   program instructions, stored on at least one of the one or more storage devices for execution by at least one of the one or more processors via at least one of the one or more memories, to render, in the virtual universe, the object as modified in accordance with the first template;
   program instructions, stored on at least one of the one or more storage devices for execution by at least one of the one or more processors via at least one of the one or more memories, to detect a movement of a particular avatar in the virtual universe from a detection area into a field of view that includes the object, wherein the movement of the particular avatar into the field of view is a particular contextual change that is included in a set of contextual changes associated with the object, and still further wherein the detection area is adjacent to the field of view;
   program instructions, stored on at least one of the one or more storage devices for execution by at least one of the one or more processors via at least one of the one or more memories, to identify a second template of the plurality of templates after detecting the movement of the particular avatar from the detection area into the field of view;
   program instructions, stored on at least one of the one or more storage devices for execution by at least one of the one or more processors via at least one of the one or more memories, to modify the object in accordance with the second template, wherein the program instructions to modify the object in accordance with the second template comprise program instructions to use data included in the second template to change the shape, the color, and the texture of the object;
   program instructions, stored on at least one of the one or more storage devices for execution by at least one of the one or more processors via at least one of the one or more memories, to render, in the virtual universe, the object as modified in accordance with the second template;
   program instructions, stored on at least one of the one or more storage devices for execution by at least one of the one or more processors via at least one of the one or more memories, responsive to any avatar moving from an outside zone that is adjacent to the detection area into the detection area, to trigger an initiation process;
   program instructions, stored on at least one of the one or more storage devices for execution by at least one of the one or more processors via at least one of the one or more memories, to, during the initiation process, begin preparations to display the object to the avatar when the avatar moves into the detection area without displaying the object during the preparations, and wherein the avatar is incapable of viewing the object while the avatar is in the detection area; and
   program instructions, stored on at least one of the one or more storage devices, to identify the field of view using a focal point that is different from a location of the object, wherein the field of view is an area that is within a predetermined radius from the focal point.

* * * * *